April 19, 1932. L. W. WITRY ET AL 1,854,436
DRIVE COUPLING FOR PUMP JACKS
Filed Oct. 7, 1926 2 Sheets-Sheet 2
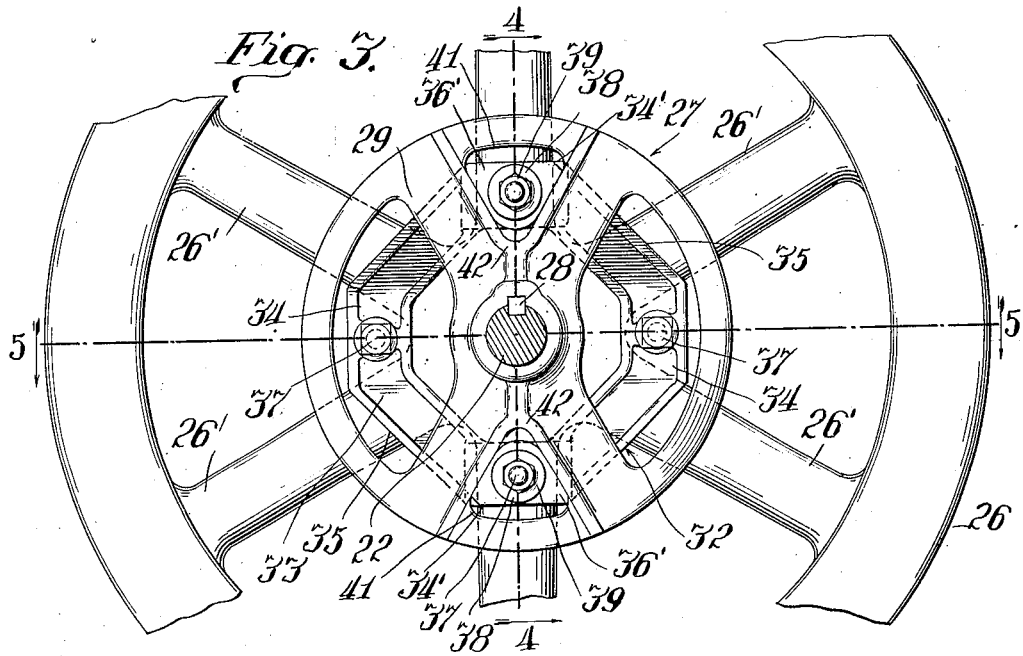
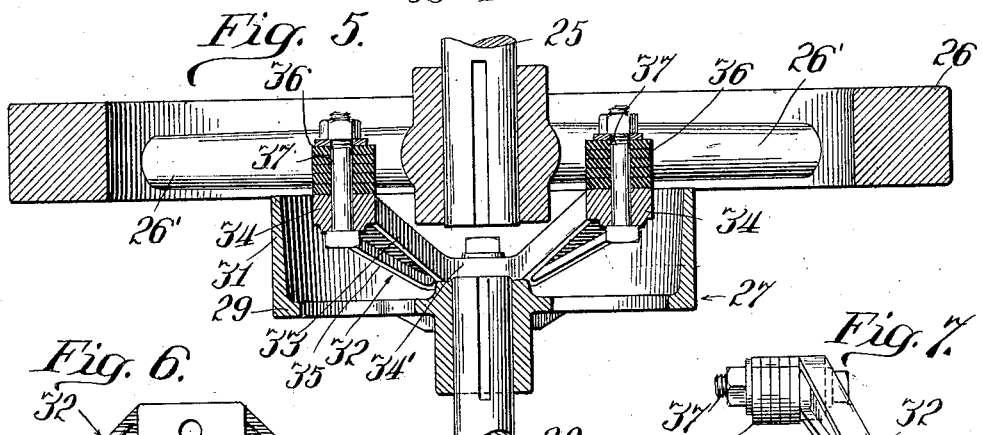
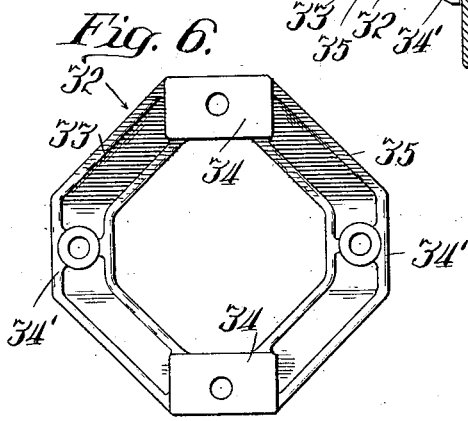
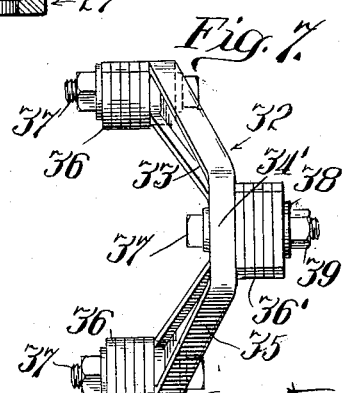

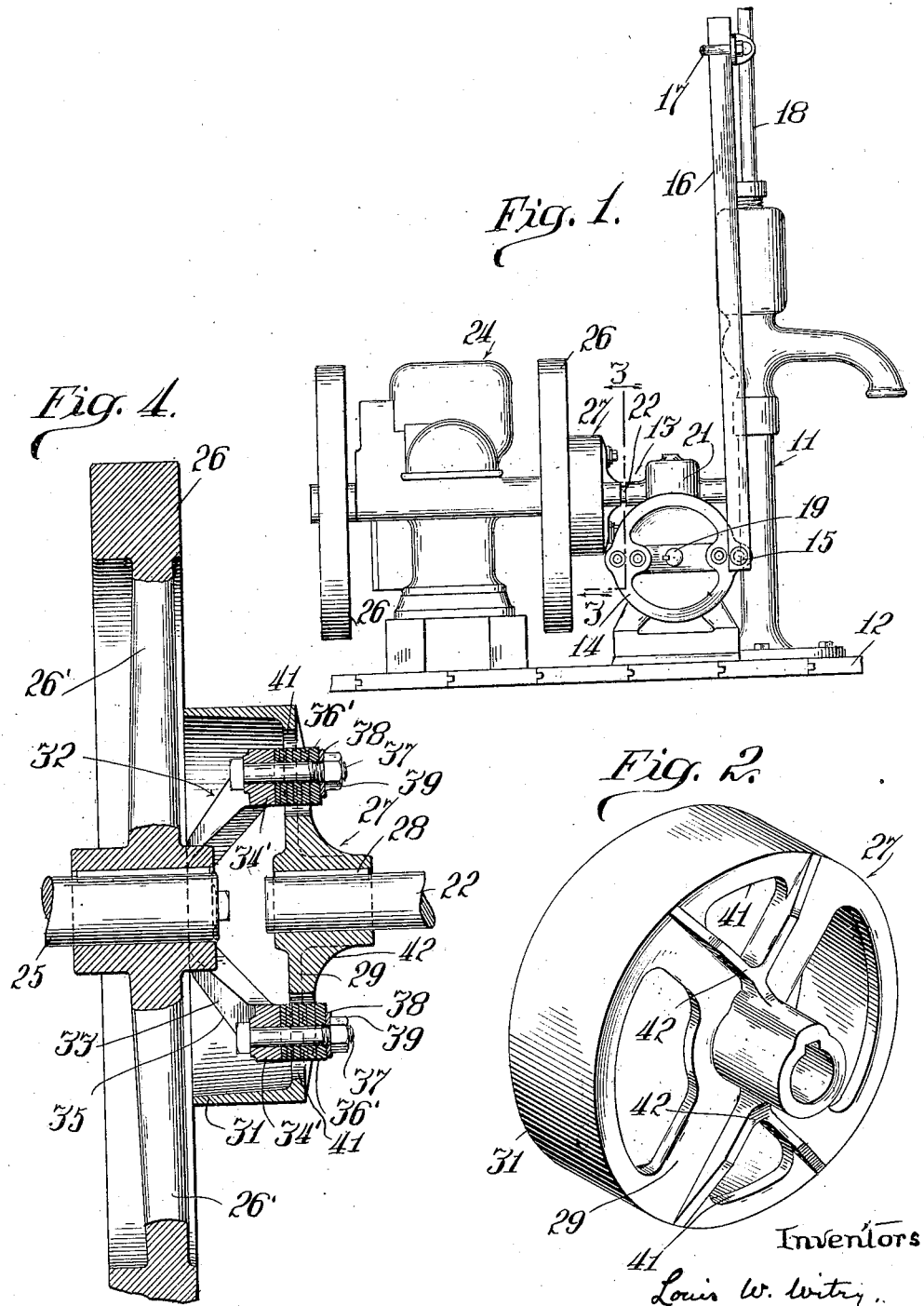

Patented Apr. 19, 1932

1,854,436

UNITED STATES PATENT OFFICE

LOUIS W. WITRY AND JOHN E. CADE, OF WATERLOO, IOWA, ASSIGNORS TO JOHN DEERE TRACTOR COMPANY, OF WATERLOO, IOWA, A CORPORATION OF IOWA

DRIVE COUPLING FOR PUMP JACKS

Application filed October 7, 1926. Serial No. 140,060.

Our invention pertains to an improved form of drive coupling designed for connecting a pump jack to an internal combustion engine or like source of power.

The typical pump jack is usually adapted for direct association with the pump to be operated, necessitating the mounting of the pump jack in immediate proximity to the pump. Such pump jacks generally comprise reduction gearing and cooperating crank means for converting a relatively high speed rotary motion into a slow speed reciprocating motion, which is applied through a suitable link to the vertically reciprocating pump shaft. In most instances, the power driven shaft of the pump jack is directly connected to the crank shaft or fly wheel of a stationary farm engine employed to operate the pump. This direct connection ordinarily requires some accuracy in alinement between the axis of the power driven shaft of the jack and the crank shaft of the stationary engine.

Conditions usually encountered in such installations make it very difficult to secure this alinement and to maintain the same. Often times the engine and pump jack are set on the ordinary wood pump platform, which may be warped, uneven, or susceptible to vibration, or are set on some other equally unsatisfactory base. The prior couplings with which we are familiar are not capable of giving the desired latitude of coupling movement to accommodate these conditions satisfactorily. Furthermore, the majority of such prior couplings have the additional objection of requiring special attachments, or requiring the alteration of standard constructions as found in present day farm engines and pump jacks.

The object of the present invention is to provide a coupling connection between the drive shaft of such pump jack and the fly wheel of the internal combustion engine, which will have wide latitude of coupling movement to take care of a considerable discrepancy in alinement; and which will require no material alteration of or addition to standard constructions of the engine and pump jack.

Further objects of the invention are to provide a coupling which will adapt itself to dis-alinement wherein the axes of the two shafts intersect at an angle, or wherein the axes of the two shafts are parallel, but offset from each other; to provide a coupling which will be practically noiseless in its operation even with a considerable degree of dis-alinement existing between the shafts; to provide a coupling which will permit of considerable variation in the separation or endwise spacing between the shafts; and to provide a coupling which will be very simple in construction and which will have long life.

Referring to the accompanying drawings illustrating a preferred embodiment of our invention:

Fig. 1 is an elevational view of a typical installation of pump jack and direct connected gasoline engine showing our improved coupling connection therebetween;

Fig. 2 is a perspective view of the driven element or pulley which is mounted on the shaft of the pump jack;

Fig. 3 is a fragmentary sectional view taken approximately on the plane of the line 3—3 of Fig. 1;

Fig. 4 is a transverse sectional view taken on the plane of the line 4—4 of Fig. 3, showing the engagement of the coupler projections in the driven element;

Fig. 5 is a similar sectional view taken on the plane of the line 5—5 of Fig. 3, showing the engagement of the opposite coupler projections in the driving element or engine fly wheel;

Fig. 6 is a front elevational view of the coupler with the projections removed; and Fig. 7 is a side elevational view of the coupling member per se with the projections thereon.

Referring to Fig. 1, a typical form of water pump is indicated at 11, the pump head being mounted on a platform 12, illustrated as being constructed of a plurality of boards to represent typical conditions. The pump jack, designated 13 in its entirety, comprises a crank disc 14 having a crank pin 15 extending therefrom, to which is connected the lower end of a link or connecting rod 16.

The upper end of this link is generally connected through a suitable clamp 17 to the upper end of the pump shaft 18. The shaft 19 on which the crank disc 14 is mounted extends into a housing 21 in which is contained suitable reduction gearing, such as a worm and worm wheel, for operatively connecting the power driven shaft 22 of the pump jack in a speed reduction to the aforesaid shaft 19. A typical stationary engine is indicated at 24, comprising the usual crank shaft 25 and fly wheels 26. This engine is shown as being supported on the wood platform 12, also representative of typical conditions. In directly connecting the engine to the pump jack the shafts 22 and 25 are brought into alinement, or substantial alinement, and are coupled together in a power transmitting relation.

The present coupling for establishing this power transmitting relation comprises a driven element 27 which is keyed at 28 to the driven shaft 22 of the pump jack. This driven element has a web portion 29 having specially formed openings therein for cooperation with the intermediate coupling member, which openings we shall hereinafter describe. To adapt this driven element 27 to other utilities we preferably construct the same in the form of a belt pulley having a peripheral rim 31 over which a belt may track in the event that it is desired to drive the pump jack by a belt drive.

Contained within this pulley is a coupling member, designated 32 in its entirety, which has operative connection on one side to the adjacent fly wheel 26—this corresponding to a driving element—and on the other side to the driven element 27.

The coupler member 32 comprises an open frame-like member 33 of substantially rectangular or square outline as viewed in end elevation in Fig. 6. The corners of this frame are constructed in the form of heavy pads or plate portions 34, 34, and 34', 34' formed integral with the frame. The side portions 35 of the frame extending between these plate portions are inclined laterally in alternating sequence, as best shown in Fig. 7, whereby the outer faces of the two diametrically opposite plates 34, 34 are disposed in a plane offset laterally from the plane of the other faces or plate portions 34', 34'.

Secured to these pads or plate portions and extending laterally therefrom are projections 36, 36, and 36', 36' which effect coupling engagement with the driving and driven elements 26 and 27. Each of these projections is made of a material which will be sufficiently heavy and durable to stand up under the friction and stresses to which it is subjected from any disalinement of the shaft, but which is non-metallic in character so as to avoid continuous noise and the necessity of lubrication. Preferably these projections are composed of leather, fiber or the like. When constructed of leather, they may be made of heavy sole leather or rawhide, built up of successive plies and all secured together and to their respective plate portions by bolts 37 which pass through holes in the plate portions and through holes in the successive plies and receive washers 38 and nuts 39 on their outer ends. The four projections are triangular in outline, as best shown in Fig. 3, and are all duplicates of each other so that the entire coupler member is symmetrical and may be assembled with either end thereof facing the driving or driven elements. Moreover, by virtue of the fact that both sides or ends of the coupler member are duplicates, it may be reversed in the event of uneven wear of one side or end thereof.

The two projections 36, 36, which are shown as facing the fly-wheel 26, engage between pairs of adjacent spokes 26' of the fly-wheel. The triangular form of the projections results in their snug seating in the V-shaped apices between the spokes. The two opposite projections, designated 36', 36' fit in triangularly shaped openings 41 formed in the web 29 of the driven element 27. The outer side of the web 29 is formed with extending ribs 42 which define the sloping side surfaces of the openings 41 and which afford extended areas of bearing contact between the projections 36' and the driven element.

It will be observed from the foregoing that the engine fly-wheel 26 has driving connection with the coupling member at two diametrically opposite points. The section plane 5—5 in Fig. 3 represents the diametrical lines on which this driving engagement is established. It will also be observed that the coupling member has driving engagement with the driven element 27 at two diametrically opposite points, represented by the diametrical line of the section plane 4—4 of Fig. 3. These two diametrical planes of driving connection are at right angles to each other. In the event of disalinement of the two shafts 22 and 25, wherein the axes of the shafts are inclined at an angle to each other, the rocking movement of the coupling member relative to these two diametrical lines will give a wide latitude of coupling movement for accommodating a considerable degree of such disalinement. Also, the projections 36, 36' preferably have a certain freedom of movement both radially and laterally in their respective openings in the driving and driven elements, and this freedom of movement will accommodate disalinement wherein the axes of the two shafts are parallel but offset relative to each other.

It will be noted that the side edges of the spokes 26' and the side surfaces of the openings 41 extend non-radially of the coupler element and at such angles that they exert a camming action thereon. That is to say, in the rotation of the coupling member these sloping angles tend to cam the projections 36, 36′ outwardly in opposite directions. Thus the coupling member tends to center itself relative to the two axes of the shafts. The considerable over-all length of each coupler projection 36, 36′, and the open center construction of the frame 33 are of particular advantage as they accommodate considerable variation in the spacing between the ends of the shafts 22 and 25. In some instances, because of either shaft projecting considerably beyond the hub of its driving or driven element, or because of variations in the lengths of these hubs, it may be necessary to dispose the pulley element 31 at different distances from the fly-wheel 26. Irrespective of such variations in the spacings between these two elements, the coupling member, through the considerable length of the projections 36, 36′ will maintain an effective driving relation between the two. The coupling member is virtually floated between the driving and driven elements, and can move backwardly or forwardly between the same if necessary. The limit of such longitudinal floating motion occurs when one or the other pairs of plates 34, 34′ engages with the spokes of the fly-wheel 26 or with the web portion of the driven element 27. The contact between the leather or fiber projections and the driving and driven elements is practically noiseless, even when the shafts are considerably out of alinement. While, according to the preferred construction, the driving relation between the intermediate coupling member and each of the cooperating elements 26 and 27 is established through two diametrically opposite points of coupling connection, the number of such points of coupling connection might be increased or decreased, if desired.

Having thus described our invention, what we claim as new and desire to secure by Letters Patent of the United States, is—

1. The combination with a driven shaft and a drive shaft and a spoked fly-wheel secured thereon, of means for coupling the same together in a direct coupled drive comprising a driven element on the driven shaft and a rigid coupler member having projections of yieldable material projecting only from one side of said coupler and loosely engaging in openings in said driven element and having like projections projecting only from the opposite side of said coupler and loosely engaging between the spokes of the fly-wheel.

2. The combination with a driven shaft and a drive shaft and a spoked fly-wheel secured thereon, of means for coupling the driven shaft to said fly-wheel comprising a driven element on said driven shaft, a coupler member between said driven element and said fly-wheel, and projections extending from opposite sides of said coupler member and substantially parallel with the axes of said driven shaft and fly-wheel, said projections loosely engaging in openings in said driven element and loosely engaging between the spokes of said fly-wheel.

3. The combination with a driving element and a driven element, of a coupler member between said elements having wedge shaped projections of yieldable material extending from opposite sides thereof for engaging with cooperating surfaces on said driving and driven elements, said wedge shaped projections acting to constantly urge said coupler member into axial alignment with the driving and driven elements.

4. The combination with a spoked fly wheel, a belt pulley alined substantially coaxially therewith for a direct coupled drive, and means rotatably supporting said pulley, of a coupling member enclosed within said belt pulley and operatively connected thereto, and comprising means for engaging between the spokes of the fly wheel.

5. The combination with a spoked fly wheel, a belt pulley alined substantially coaxially therewith for a direct coupled drive, and means rotatably supporting the pulley, of a coupling member floating between said fly wheel and said belt pulley, and partially enclosed within the latter, said coupling member comprising oppositely extending projections engaging in openings in said belt pulley and engaging between the spokes of said fly wheel.

6. The combination with a spoked fly wheel and a driven element, of a coupling member between said fly wheel and said driven element comprising an open center frame having projections extending from opposite sides of the marginal portion of said frame and substantially parallel with the axis of said coupling member for loosely engaging between the spokes of said fly wheel and in openings in said driven element, the open center of said frame permitting the shafts of said fly wheel and driven element to be extended into said frame in proximity to each other.

7. The combination with driving and driven elements, of a coupling member between said elements comprising a substantially rectangular frame having adjacent sides inclined alternately relative to the axis of said coupling member, and projections mounted on the corners of said frame and extending in opposite directions therefrom for engaging cooperating surfaces on said driving and driven elements.

8. The combination with a spoked fly wheel and a driven element, of a coupling member between said fly wheel and said driven element having projections extending from opposite sides thereof and engaging between the spokes of said fly wheel and in openings in said driven element, the power transmitting surfaces of said projections being sloped at angles tending to urge said projections outwardly in the rotation of the coupling member.

9. The combination with driving and driven elements, of a coupling member between said elements having projections extending from opposite sides thereof, said projections being wedge shaped and engaging with surfaces on the driving and driven elements at angles tending to urge said projections outwardly in the rotation of said coupling member.

10. The combination with a spoked fly wheel and a pulley member having openings in the web portion thereof, of a coupling between said fly wheel and said pulley member comprising a substantially rectangular frame having two diagonally opposite corners projecting laterally toward said fly wheel and the two other corners projecting laterally toward said pulley member, wedge shaped projections composed of a plurality of plies of leather projecting from said first-named corners and engaging between the spokes of said fly wheel, and a second pair of projections composed of a plurality of plies of leather extending from the last-named corners of said frame and engaging in the openings in said pulley member.

11. The combination with an apertured fly wheel, a driven element aligned substantially co-axially therewith for a direct coupled drive, and means rotatably supporting said driven element, of a coupling member enclosed within said driven element and operatively connected thereto, and comprising means for engaging within the apertures in said fly-wheel.

12. The combination with an apertured fly-wheel, a driven element aligned substantially co-axially therewith for a direct coupled drive and having spaced openings therein, and means rotatably supporting said driven element, of a coupling member floating between said fly-wheel and said driven element, and partially enclosed within the latter, said coupling member comprising oppositely extending projections engaging in the openings in said driven element and engaging within the apertures in said fly-wheel.

LOUIS W. WITRY.
JOHN E. CADE.